S. FU A. BITONTI.
FISH TRAP.
APPLICATION FILED AUG. 12, 1921.
1,412,649.
Patented Apr. 11, 1922.
2 SHEETS—SHEET 2.
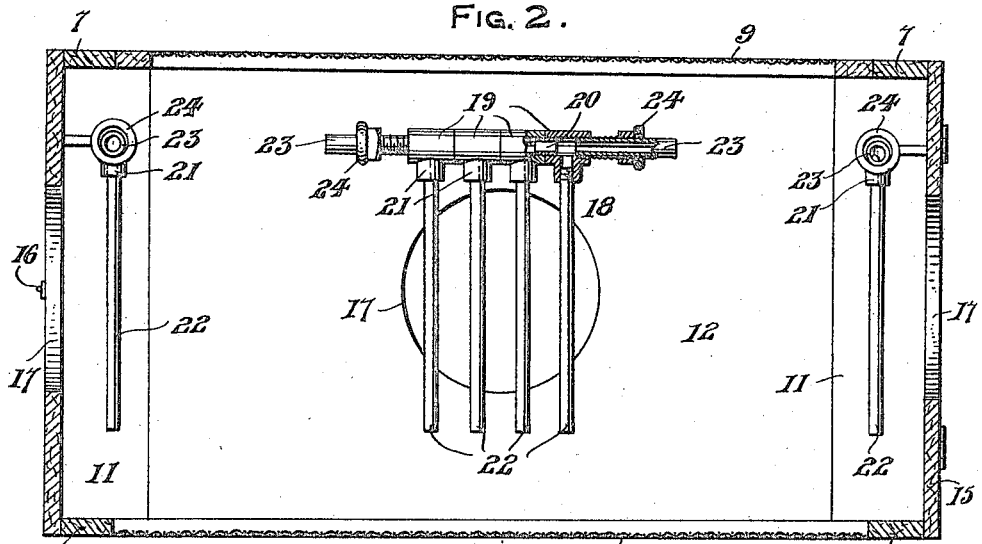
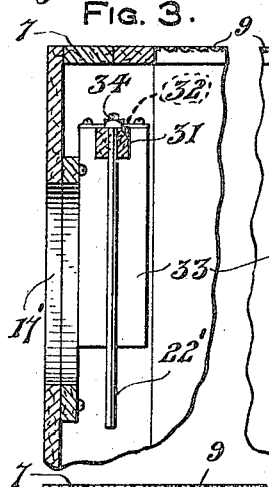
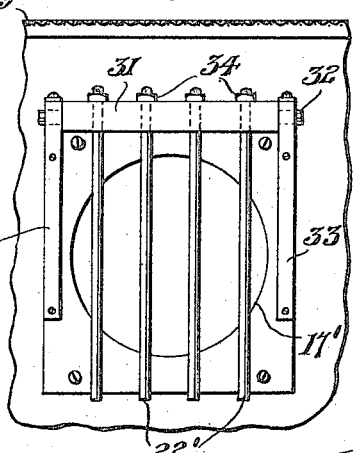
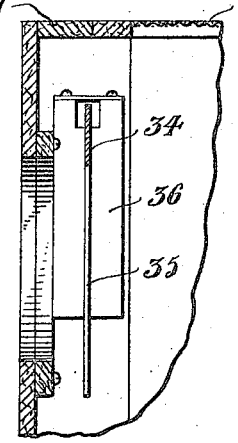
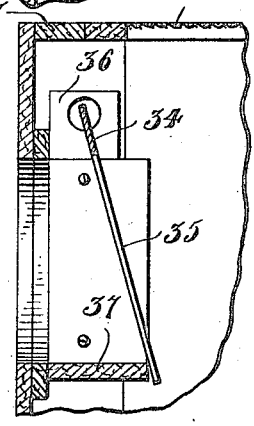
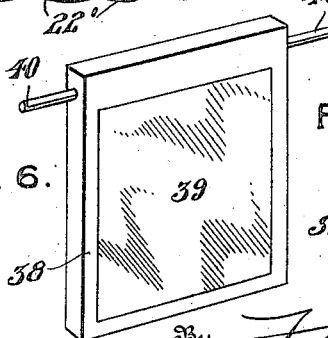
Inventor
S. fu A. Bitonti
By F. L. Bryant
Attorney

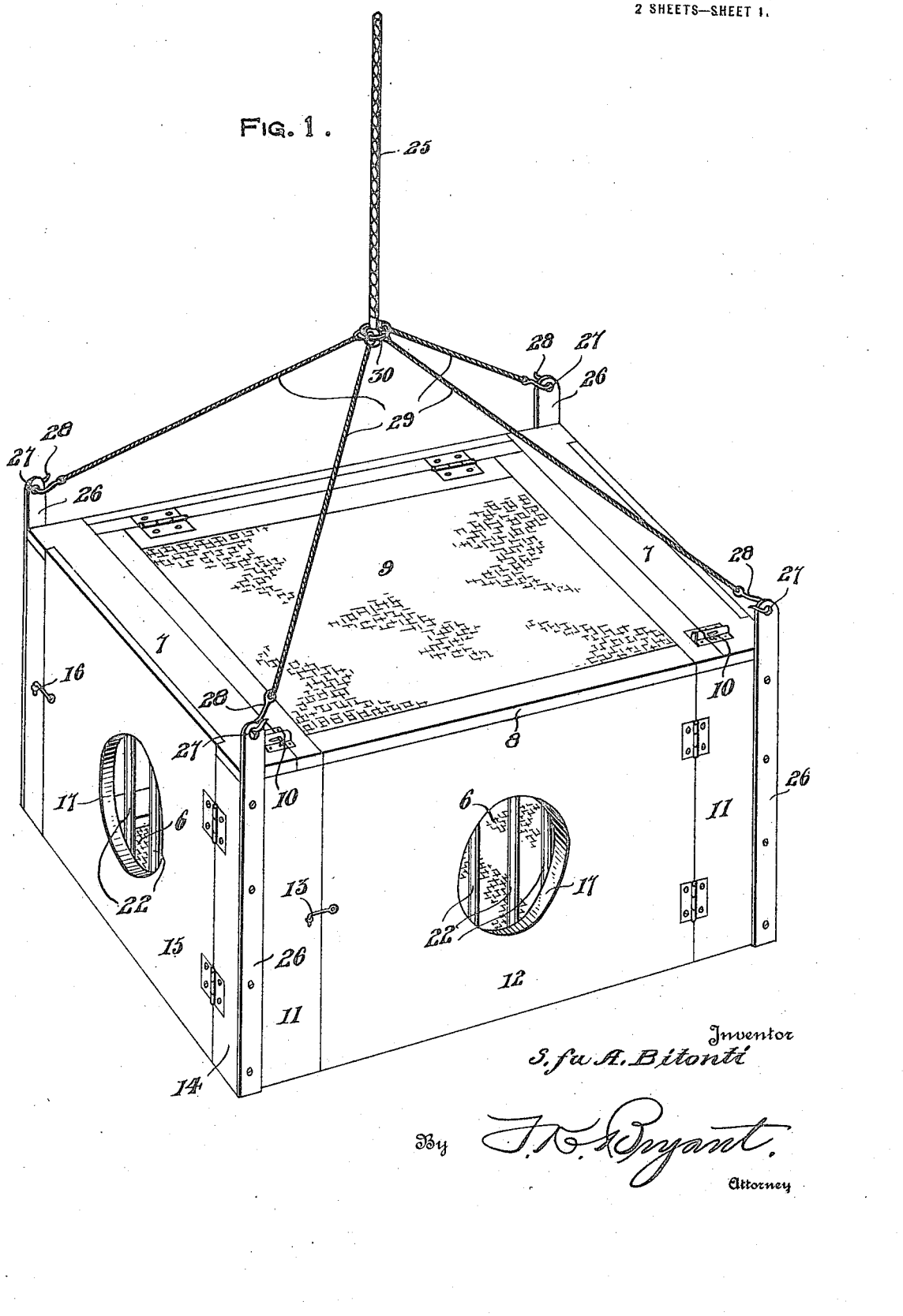

UNITED STATES PATENT OFFICE.

SALVATORE FU ANTONIO BITONTI, OF CLARKSBURG, WEST VIRGINIA.

FISH TRAP.

1,412,649.      Specification of Letters Patent.     Patented Apr. 11, 1922.

Application filed August 12, 1921. Serial No. 491,797.

*To all whom it may concern:*

Be it known that I, SALVATORE FU ANTONIO BITONTI, a subject of the King of Italy, residing at Clarksburg, in the county of Harrison and State of West Virginia, have invented certain new and useful Improvements in Fish Traps, of which the following is a specification.

This invention relates to certain new and useful improvements in fish traps of that type embodying a cage or receptacle adapted for submergence in a body of water and provided with entrance openings closed by swinging gates which may be opened inwardly for permitting entrance of the fish into the receptacle but which may not be swung outwardly by the fish so that the fish are effectively trapped.

The primary object of the invention is to generally simplify and improve devices of the present kind.

Another object of the invention is to provide improved gates for the entrance openings of a fish trap.

With these general objects in view and others that will appear as the nature of the invention is better understood, the same consists in the novel construction, combination, and arrangement of parts hereinafter more fully described, illustrated in the accompanying drawings, and then claimed.

In the drawings forming a part of this application, and in which like designating characters refer to corresponding parts throughout the several views, Figure 1 is a perspective view of a fish trap constructed in accordance with the present invention, Figure 2 is a view of the device shown in Figure 1, with one of the side walls removed, and with parts shown partly in section, Figure 3 is a fragmentary vertical sectional view showing a modified form of entrance gate, Figure 4 is a view looking toward the left of Figure 3, Figure 5 is a view similar to Figure 3, showing a still further modified form of entrance gate, Figure 6 is another view similar to Figure 3, showing a further modification of the entrance gate and opening, and Figure 7 is a perspective view of still another form of entrance gate.

Referring more in detail to the several views, the present invention preferably consists of a hollow rectangular casing or receptacle whose walls are preferably formed of wood, the bottom wall 5 of the same being provided with a relatively large central opening spanned by a foraminous sheet of material 6 such as wire screening or the like, and the top wall 7 being provided with a similar opening closed by a hinged cover 8 having its major portion formed of a sheet of wire screening 9 or the like. The cover 8 may be provided with any suitable form of latch 10 for holding the same closed and the side walls 11 of the receptacle include relatively large hinged panels 12 held in closed position by a hasp 13 or the like, and adapted to swing outwardly for permitting access to the interior of the receptacle from either side thereof. In a like manner, the ends 14 of the receptacle embody relatively large hinged panels 15 with hasps 16 for retaining the same closed so that access may also be had to the interior of the receptacle from either end of the latter. Side and end walls 11 and 14 are each provided with relatively large openings 17 therein substantially centrally of the panels 12 and 15 through which fish may pass into the receptacle when the latter is submerged in the water, and a gate 18 is disposed inwardly of each opening 17 for normally closing the same, said gate being mounted upon a horizontal axis at its upper end to swing inwardly for admitting the fish.

In the preferred form of the device, the gate 18 consists of a plurality of standard T-fittings 19 joined in end to end relation by externally-threaded nipples 20 so that the branch 21 of each T-fitting depends, a relatively long rod or pipe section 22 being screwed into each branch portion 21 so as to provide a form of grating, and the lower ends of the bars or pipes 22 being disposed to engage the inner faces of the panels 12 and 15, whereby outward swinging of the gates will be prevented, and escape of the fishes trapped within the receptacle thereby prevented.

In the end ones of the T-fittings 19 are threaded relatively short pipe sections 23 forming pivots which are journaled in eye-brackets 24 suitably fixed to the panels 12 and 15 whereby the gate is mounted for swinging upon horizontal axes. In this way the gate may be constructed to the desired size by the addition or removal of a desired number of T-fittings 19 and a durable and cheap form of gate is provided which will tend to maintain a vertical position at all times in line with the openings 17. Fish traps of the present character are usually suspended by means of a cable 25 from a fishing boat or the like and in order to properly support the receptacle a plurality of upright corner irons or straps 26 are secured to the opposite sides of the receptacle near the ends of the latter with the upper ends of said irons or straps extending a slight distance above the top of the receptacle and formed with openings 27 engaged by hooks 28, each hook 28 being fastened upon one end of a flexible member 29, and the four flexible members 29 being attached to a ring 30 to which the rope 25 is also attached whereby the flexible members 29 are in upwardly extending converging relation when in use, and whereby the trap is effectively supported against tilting and in a proper position when submerged.

In the use of the present device, a desired bait may be placed within the receptacle if deemed necessary and then the receptacle may be lowered into the water by means of the cable 25. The fish may swing the gates 18 inwardly to obtain access to the bait whereupon said gates will automatically return to their normally vertical position so that the fish are effectively trapped or prevented from passing out of the receptacle. In this manner a quantity of fish may be caught with little attention or labor.

As shown in Figures 3 and 4, the gate may be modified to include a plurality of vertical rods or pipes 22' having their upper ends extended through and fixed in spaced vertical openings provided in a horizontal bar 31 which is provided with reduced cylindrical ends 32 journaled in suitable rigid brackets 33 mounted at opposite sides of the openings 17', suitable nuts 34 being threaded upon the upper ends of the rods 22' above the bar 31. This provides a gate structure which may be composed of any desired number of bars 22' in accordance with the size of the opening and also combines durability and simplicity of construction.

Referring to Figures 5 and 6, the pivot bar or member and the depending bars may be formed from a single sheet of metal by stamping the same, the horizontal pivot bar being denoted by the numeral 34 and integral depending gate bars being denoted by the numeral 35. In both of the forms shown in Figures 5 and 6, suitable mounting brackets are provided for pivotally receiving extended reduced end portions of the bar 34 and said brackets being broadly denoted by the numeral 36.

However, in Figure 6 the brackets 36 may be continued to provide a U-shaped entrance casing with a bottom ledge as at 37 to form a stop for the gate when the latter is in a slightly inwardly inclined position. Referring to Figure 7, a further modification of gate is shown including a rectangular frame 38 having a plane glass or mirror panel or pane 39 and provided with oppositely extending pintles 40 near the upper end thereof for mounting the gate upon horizontal axes as illustrated in connection with the other forms.

While the form of the invention herein shown and described is what is believed to be the preferred embodiment thereof, it is nevertheless to be understood that various forms, modifications, and arrangements of parts may be made without departing from the spirit and scope of the invention as claimed.

I claim:—

1. A fish trap of the class described comprising a substantially rectangular casing including side and end walls each having an outwardly swinging hinged panel provided with means for retaining the same in closed position, said panels and walls being substantially imperforate and each panel being provided with a substantially central relatively large fish entrance opening, and gates for said openings, one gate being mounted on each panel at its upper end and within the receptacle for swinging movement upon a horizontal axis whereby entrance of a fish through said relatively large openings is permitted while exit of the fish through said openings is prevented.

2. A fish trap of the class described comprising a substantially rectangular casing including side and end walls each having an outwardly swinging hinged panel provided with means for retaining the same in closed position, said panels and walls being substantially imperforate and each panel being provided with a substantially central relatively large fish entrance opening, gates for said openings, one gate being mounted on each panel at its upper end and within the receptacle for swinging movement upon a horizontal axis whereby entrance of a fish through said relatively large openings is permitted while exit of the fish through said openings is prevented, said receptacle embodying top and bottom walls with foraminous panels, said top wall including a hinged cover carrying the foraminous panel thereof.

3. In a fish trap of the class described, the combination with a casing having a fish entrance opening, of a gate mounted for swinging movement upon a horizontal axis at its upper end inwardly of said opening, said gate including a plurality of externally threaded nipples and a plurality of T-fittings detachably and rigidly joined in end to end abutting relation by said nipples with the branch portions of said T-fittings depending and alined, and straight pipes or bars having their upper ends threaded into the branches of said T-fittings.

4. In a fish trap of the class described, the combination with a casing having a fish entrance opening, of a gate mounted for swinging movement upon a horizontal axis at its upper end inwardly of said opening, said gate including a plurality of externally threaded nipples and a plurality of T-fittings detachably and rigidly joined in end to end abutting relation by said nipples with the branch portions of said T-fittings depending and alined, straight pipes or bars having their upper ends threaded into the branches of said T-fittings, and pintle-forming pipe sections detachably threaded into the outer ends of the end T-fittings.

In testimony whereof I affix my signature.

SALVATORE fu ANTONIO BITONTI.